(12) United States Patent
Von Ryberg

(10) Patent No.: US 12,203,322 B2
(45) Date of Patent: Jan. 21, 2025

(54) FLEXIBLE SEAL WITH RODENT RESISTANT BARRIER

(71) Applicant: RODEXIT APS, Holte (DK)

(72) Inventor: Bjørn Von Ryberg, Holte (DK)

(73) Assignee: RODEXIT APS, Holte (DK)

( * ) Notice: Subject to any disclaimer, the term of this patent is extended or adjusted under 35 U.S.C. 154(b) by 0 days.

(21) Appl. No.: 18/723,076

(22) PCT Filed: Dec. 21, 2022

(86) PCT No.: PCT/DK2022/000309
§ 371 (c)(1),
(2) Date: Jun. 21, 2024

(87) PCT Pub. No.: WO2023/116996
PCT Pub. Date: Jun. 29, 2023

(65) Prior Publication Data
US 2024/0418032 A1 Dec. 19, 2024

(30) Foreign Application Priority Data

Dec. 26, 2021 (DK) .............................. PA 202101275
Jan. 20, 2022 (DK) .............................. PA 202200056

(51) Int. Cl.
*E06B 7/23* (2006.01)
*A01M 29/30* (2011.01)

(52) U.S. Cl.
CPC ........... *E06B 7/2316* (2013.01); *A01M 29/30* (2013.01); *E06B 7/2314* (2013.01)

(58) Field of Classification Search
CPC ...... E06B 7/2316; E06B 7/2314; A01M 29/30
See application file for complete search history.

(56) References Cited

U.S. PATENT DOCUMENTS 5,615,896 A * 4/1997 Morvant .............. F16J 15/3232
277/537
11,466,510 B2 10/2022 Von Ryberg
(Continued)

FOREIGN PATENT DOCUMENTS

JP S6368421 A 3/1988
WO 2018099532 6/2018
(Continued)

*Primary Examiner* — Vishal A Patel
(74) *Attorney, Agent, or Firm* — DINSMORE & SHOHL LLP

(57) ABSTRACT

An elastic oblong seal has a sealing section with a flexible outer body and a rodent resistant barrier therein. The barrier includes separate metal wires arranged at a distance to each other and extending substantially in parallel to a seal longitudinal direction. The outer body includes a TPE constituting the basic material and form of the seal. The metal wires include at least three separate metal wires each of solid single stranded metal. At least two of the at least three are encompassed by a TPE which is at least one chemically modified PP, selected from the group consisting of: a PP grafted with carboxylic acid, PP grafted with anhydride groups, a PP grafted with epoxides, a PP grafted with silanes, a MAPP, a PP grafted with methacrylic acid, a PP grafted with glycidyl methacrylate, a PP grafted with vinyl trimethoxysilane, and a PP grafted with methacryl trimethoxysilane.

14 Claims, 9 Drawing Sheets

(56) References Cited

U.S. PATENT DOCUMENTS

| | | | | |
|---|---|---|---|---|
| 2005/0206095 A1* | 9/2005 | Keefe | ............... | F16J 15/064 |
| | | | | 277/628 |
| 2011/0154732 A1* | 6/2011 | Shields | ............ | A01M 29/30 |
| | | | | 43/107 |
| 2016/0221427 A1* | 8/2016 | Robinson | ............ | B60J 11/04 |
| 2018/0016792 A1* | 1/2018 | Valdez | ............... | F16L 37/02 |
| 2019/0316410 A1* | 10/2019 | Von Ryberg | ......... | B29C 48/07 |
| 2021/0095520 A1 | 4/2021 | Frimand | | |
| 2022/0010614 A1 | 1/2022 | Von Ryberg | | |

FOREIGN PATENT DOCUMENTS

| | | |
|---|---|---|
| WO | 2018099533 | 7/2018 |
| WO | 2019120454 | 6/2019 |
| WO | 2020098888 A1 | 5/2020 |

\* cited by examiner

US 12,203,322 B2

FLEXIBLE SEAL WITH RODENT RESISTANT BARRIER

CROSS-REFERENCE TO RELATED APPLICATIONS

This application is the U.S. National Stage of PCT/DK2022/000309 filed on Dec. 21, 2022, which claims priority to Denmark Patent Application PA 202101275 filed on Dec. 26, 2021, and Denmark Patent Application PA 202200056 filed on Jan. 20, 2022 the entire content of both are incorporated herein by reference in their entirety.

FIELD OF THE INVENTION

Seals for pest proofing.

BACKGROUND OF THE INVENTION

1. Terminology

"Separate Metal Wires" means metal wires that are not interconnected by means of other metal wires. For the avoidance of any doubt: Parallel metal wires that are interconnected by means of metal wires—such as metal wires extending perpendicularly to the longitudinal direction of the parallel metal wires and thereby forming a mesh—are not Separate Metal Wires.

"Extraction Resistance" of a Separate Metal Wire in a polymer seal means the resistance against extraction of the Separate Metal Wire in the longitudinal direction of the metal wire from a 14 cm long piece of the seal. It is measured by fixating the position of a 14 cm long piece of the seal horizontally in a 20-25 degrees Celsius warm room, and by means of a substantially uniform force pulling the metal wire in the longitudinal direction of the wire for 60 seconds. The pulling force is measured with a spring balance or a similar measuring device. The measuring device may be attached to a piece of the metal wire A) that sticks out of the 14 cm long sample and B) that may be provided with a loop by means of which the force can be applied. The Extraction Resistance value of the metal wire is the force measured in Newton that is required for pulling the metal wire completely out of the seal in less than 60 seconds. E.g. if a wire is completely extracted in 57 seconds when subjected to an extraction force of 98 Newton, it can be concluded that the Extraction Resistance of the wire has been less than 98 Newton. The force in Newton is the average load during the time it takes to extract the wire measured in kg multiplied by 9.81.

"Straight Metal Wire" means a straight metal wire that has not been subjected to irreversible deformation e.g. permanent wave-shaping by means of corrugating rolls. A wire shall not be considered irreversible deformed if the wire has been deformed and is kept in the deformed state by means of a force, from which the wire can be released, and the natural elasticity of the metal wire will make it bounce back to the wire's previous straight form or a semi-straight form once the wire has been released. For the avoidance of any doubt: Merely rolling a metal wire into a roll, from which it can be easily unrolled shall not be considered irreversible deformation.

"Double-Extrusion" means an extrusion process run by means of 2 or more extruders that provide at least 2 different resins. The extruders may provide the extrusion resins to a single die or to 2 or more separate dies that are connected in series.

To "Double-Extrude" means to run a Double-Extrusion process.

"Co-Extrusion" means an extrusion process that includes the extrusion of at least one polymer onto at least one substrate e.g. onto a metal wire.

To "Co-Extrude" means to run a Co-Extrusion process.

"The 2017-Applications" means the international patent application PCT/DK2O17/050401, the corresponding American application Ser. No. 16/464,978 and the international application PCT/DK2O17/050400.

"PP" means polypropylene.

"TPE" means thermoplastic elastomer.

"TPV" means thermoplastic vulcanizate with particles of cured rubber encapsulated in a matrix of polypropylene.

"MAPP" means maleic anhydride grafted polypropylene.

"Chemically Modified PP" means a modified PP selected from the group consisting of PP grafted with carboxylic acid, PP grafted with anhydride groups, PP grafted with epoxides, PP grafted with silanes, PP grafted with maleic anhydride (maleated PP. MAPP), PP grafted with methacrylic acid, PP grafted with glycidyl methacrylate, PP grafted with vinyl trimethoxysilane, and PP grafted with methacryl trimethoxysilane.

2. The Basic Displacement Problem

Rodents such as rats and mice can transmit very dangerous contagious diseases, which can be transferred to humans e.g. via foods. Therefore, food enterprises are in many countries subject to one or more of the following requirements, which are aimed at reducing the risk for transfer of diseases to humans, when a rat or mouse has entered the premises of a food enterprise:

The rat or mouse must be caught.

All foods, which the rat or mouse may have been in contact with, must be destroyed.

All parts of the enterprise, with which the rat or mouse may have been in contact, must be disinfected.

The enterprise must close until the problem has been completely solved.

All this is usually very costly and may run into several hundred thousand USD. Therefore, the annual losses due to rats and mice entering food enterprises are extremely high.

Rats and mice usually find their way into buildings through the threshold gaps of doors, that are not sufficiently rodent proofed e.g. by gnawing their way through polymer door sweeps without a rodent proof barrier.

Door sweeps with rodent proof barriers are known. One such door sweep is the one described in The 2017-Applications. It is a flexible door sweep for rodent proofing threshold gaps of hinged swing doors that consists of A) a flexible polymer that constitutes the Basic material of the door sweep, and that defines the form of the door sweep and B) a therein embedded rodent proofing barrier consisting of a plurality of Separate Metal Wires arranged in parallel and extending in the longitudinal direction of the door sweep.

The door sweep of The 2017-Applications would be an excellent door sweep if it didn't suffer from a severe problem: There is a substantial risk, that the wires closest to the ground will be gradually forced out of one end of the door sweep—in a movement in the longitudinal direction of the wires—when A) the seal is mounted on an horizontally opening door such as a hinged swing door, B) the door is opened and closed, and C) the door sweep due to an obstacle in front of the door is subjected to twisting forces as the door blade with the door sweep passes over the obstacle. Typical Examples of such obstacles are ground sloping negatively towards the door, a drain cover in front of the door, and unevenness in the ground in front of the door. This displacement problem is a major problem because the door sweep is unusable if the steel wires in the rodent proofing barrier cannot maintain their position in the barrier and are gradually forced out of the door sweep.

A similar displacement problem may be experienced when the rodent proofing seal is mounted on another movable member than a hinged swing door e.g. on the pit dock or the leveler ramp of a pit dock leveler, and the seal is twisted forth and back as the seal rubs against a surface when the member on which it is mounted moves forth and back relative to the surface, against which the seal rubs—e.g. when the leveler ramp of a pit dock leveler moves up and down.

The reason why the displacement problem occurs is that polymers in general adhere poorly to metals, and the position of the wires in the barrier of the seal is correspondingly poorly secured. The reason why polymers in general adhere poorly to metal is A) that polymers in general suffer from low surface energy and low wettability and B) that no chemical bonds are created between the polymers and the metals. Some polymers do have higher surface energy and wettability and therefore adhere better to metals than other polymers. However, they are often relatively hard and stiff with a hardness score above Shore A 100/Shore D 58 and they are not well suited for use as the Basic material of door sweeps because the Basic material must be flexible and elastic in order to be able to pass over obstacles in front of the doors. Examples of such polymers that adhere relatively well to metals but are unsuitable for flexible sealing sections of door sweeps are polycarbonate with a typical surface energy of 42 $mJ/m^2$ and a typical Shore D hardness score of 80 and polyethylene terephthalate with a typical surface energy of 43 $mJ/m^2$ and a typical hardness score of Shore D 81.

Several solutions to the displacement problem have been suggested. However, they all suffer from severe drawbacks and are not technically and/or commercially viable.

3. Previously Suggested Solutions and their Shortcomings

3.1 Use of Coated Metal Wires

In The 2017 Applications it is suggested that the displacement problem may be solved by using coated metal wires with a "chromate coating", a "brass alloy coating", a "deformed coating", or a "primer coating" such as a "zinc chromate primer".

The idea to use coated metal wires in order to solve the displacement problem was however soon abandoned by the applicants of The 2017-Applications. There were several reasons for that.

The door sweeps are far most effectively and economically produced by Co-Extruding solid steel wires and the polymer, that constitutes the Basic material of the seal. Steel wires are preferred to other metal wires because A) steel wires provide the best protection against rodents, and B) steel wires are a cheaper than other commercially available metal wires.

When extruding the door sweeps 2.3 km long rolls of steel are usually used for producing a batch. Coating the steel wires before extruding the seals would require the 2.3 km long steel rolls to be unwound during the coating process and to be rewound after a sufficient drying period. Though in theory technically possible it was a technically demanding and awkward process that would require investment in quite expensive machinery. Already because of this general coating problem none of the suggestions were viable solutions to the displacement problem.

When it comes to "chromate coating" and "zinc chromate coating" it was furthermore a showstopper, that steel cannot be chromated directly, and that chromating therefore cannot be used on the steel wires that are the preferred metal wires.

When it comes to "brass alloy coating" (to be more precise: brass alloy plating) it can be used on steel. However, the brass alloy plating process involves the use of highly toxic cyanide and is said to generate large volumes of hazardous waste. In addition to the previously mentioned general coating problem there was in other words another and significant reason for not choosing brass alloy plating as solution to the displacement problem.

An additional reason for not pursuing the suggested "deformed coating" solution is that The 2017-Applications did not identify any usable deformed coating materials, and the solution suggested therein therefore seems to be of purely theoretical character.

Coating steel with a "primer" works well when adhesion of paint with a high surface energy, is to be achieved. However, when adhesion to the steel of a polymer with low surface energy such as a TPE is to be achieved, coating the steel with a primer is not likely to work well. That is an additional reason for not trying to solve the displacement problem by means of a primer coating-additional to the reason caused by the general coating problem.

3.2 Wave-Shaping of the Door Sweep

As none of the solutions suggested in 2017-Application were technically and commercially viable, another solution was developed namely the solution described in PCT application PCT/DK2O18/050412. The solution is by means of corrugating rolls to provide the door sweep with a waveshape where the waves extend in the longitudinal direction of the door sweep, so the steel wires that are embedded in the door sweep are permanently deformed in a corresponding waveshape. This deformation of the steel wires increases the friction between the steel wires and the surrounding polymer of the door sweep, and the increased friction secures the position of the steel wires in the door sweep. As opposed to the abovementioned coating solutions the wave-shaping solution proved to be technically manageable and commercially viable.

However, the wave-shaping solution introduced new problems and suffers from several severe drawbacks:

It requires specialized and quite costly machinery to waveshape the door sweeps.

Because of the waveshape it takes more steel and polymer to produce a meter waveshaped seal than to produce a meter flat seal. The waveshape thus drives up the raw material costs.

Mounting a wave-shaped door sweep by means of double-sided tape is not feasible because the waveshape of the door sweep reduces the contact surface between the door sweep and the double-sided tape significantly—only the top of the waves will be in contact with the tape, and that isn't sufficient for obtaining proper adhesion. That is a significant drawback especially when one wants to mount a door sweep on a glass door where the use of nails, screws, and rivets are out of the question.

Due to the waveshape the diameter of for example a 25 m long roll of the wave-shaped door sweep (the standard roll in which the door sweep is traded) is significantly larger than the diameter of a corresponding role of a flat seal that has not been wave-shaped. Thus, the rolls of wave-shaped door sweeps take up more space when they are stored, and are shipped, and that may increase packing, storing and shipping costs.

A flat seal is better suited for certain applications than a corresponding wave-shaped seal. Flat seals are for example better suited for proofing A) stationary gaps and holes and B) the threshold gaps of doors that open and close by means of up-and-down going movements e.g. sectional garage doors. The introduction of the wave-shaped door sweep therefore makes it necessary to produce, store, market, and ship 2 different products: one wave-shaped door sweep and one flat general purpose seal, that can be used for all purposes except those where the displacement problem may occur. It is easier and cheaper to produce, store, market, and ship only one product instead of two different ones. A solution to the displacement problem according to which it isn't necessary to waveshape the door sweep, so there will be only one (flat) product to produce, store, market, and ship will therefore be very advantageous and profitable.

When wave-shaping the door sweep there is a substantial risk that the wave-shaped door sweep will curve and thereby be unusable. That happens when the height of the waves isn't exactly the same over the entire breadth of the waves. The door sweep will curve in the direction of the side, where the waves are highest (i.e. where the amplitude of the waves is largest). Several batches have at very substantial costs been discarded due to this problem.

When a wave-shaped door sweep is mounted on a door, dirt may accumulate in the small wave-gaps between the door sweep and the door, and that is undesirable especially in the pharma and food industries where hygiene is of major importance.

As an undesired side-effect of the wave-shaping process there are tiny slits where the wave tops and bottoms (crests and throughs) of the metal wires have perforated the surrounding basic material. In a door sweep with 10 parallel metal wires there will typically be 10 tiny slits for every around 1 cm corresponding to around 1,000 per meter. The slits are virtually impossible to clean effectively for germs, and that limits the usability where there are strict hygiene requirements.

BRIEF SUMMARY OF THE INVENTION

The invention solves the displacement problem and the general coating problem in a way that maintains the original flat form of the extruded product, so the drawbacks and shortcomings of the waveshape solution are avoided. The resulting product is a general-purpose rodent proofing seal that can be used even for rodent proofing threshold gaps of hinged swing doors.

The displacement problem is solved by coating the steel wires with a TPE that adheres well to steel and afterwards adding another TPE that constitutes the basic material of the seal. The TPE that constitutes the basic material of the seal can adhere well to the coating because a hot and melted TPE in general adheres well to another hot and melted TPE due to physical blending: The molecules of the 2 materials A) diffuse into the interface, B) entangle with each other, and C) are caught in the entangled position when the polymers are cooled and solidify.

The general coating problem is solved by producing the seal by means of a combined Co-Extrusion and Double-Extrusion process, where A) the wires of the barrier are fed into the extrusion die, B) a first extruder provides the TPE that is used for coating the steel wires, and C) a second extruder thereafter provides the TPE that i) constitutes the basic material of the seal and ii) defines the form of the seal.

According to the invention the steel wires are coated in an extrusion process, that constitutes an integrated part of the process during which the seal is produced-instead of as suggested in The 2017-Applications first coating the steel wires in one process and thereafter producing the final door sweep in another and independent process. Another important difference between the invention and the suggestions of The 2017-Applications is that a chemically modified TPE is used as coating material-instead of e.g. a very toxic brass alloy coating/plating.

The crosshead extrusion process that is widely used for adding insulation to electrical wires may be used when producing the seals.

TPEs are characterized by a low surface energy, and the low surface energy of polymers is the root of the previously described fundamental displacement problem. The solution according to the invention where the adhesion is secured by means of a TPE is therefore counterintuitive. That is why A) the wave-shaping solution was invented, B) suitable wave-shaping machines were build (at substantial costs), and C) production and marketing of wave-shaped door sweeps were commenced has gone on for more than 4 years.

DETAILED DESCRIPTION OF THE INVENTION

1. The Invention in General

Figure 1:
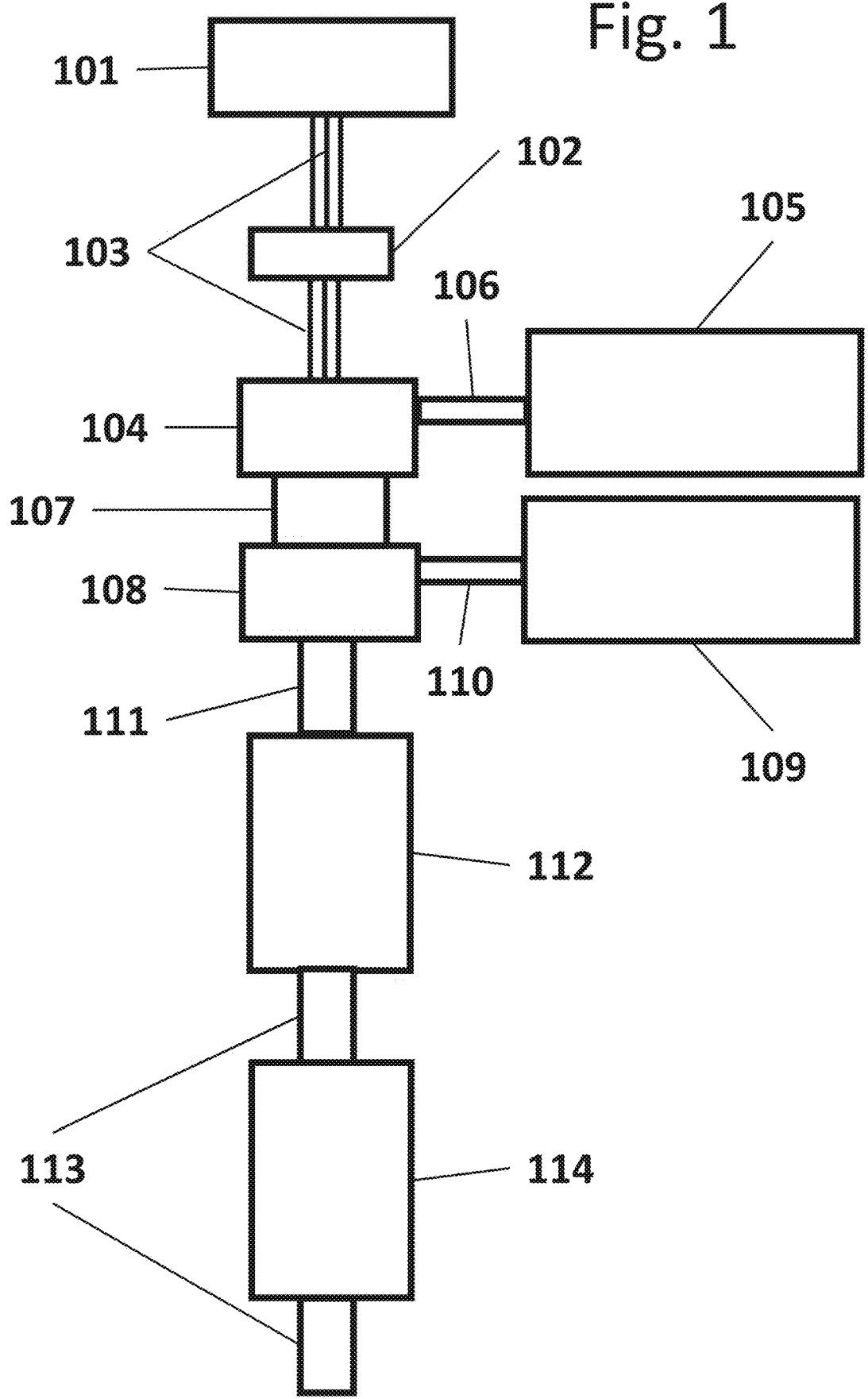
FIG. 1 is a bird's-eye view of a Double-Extrusion production line with 2 extrusion dies connected in series where 3 metal wires are fed into the first extrusion die.

The invention has the following 3 aspects:
A rodent proofing seal
A Production method
Another rodent proofing seal The invention solves the displacement problem and the general coating problem in an elegant way without changing the advantageous original flat form of the extruded seal, so all the shortcomings of the wave-shaping solution are avoided.

The displacement problem and the general coating problem are simultaneously solved by producing the seal in a single combined Co-Extrusion and Double-Extrusion process wherein the steel wires of the rodent proofing barrier is fed into the extrusion die, the steel wires by means of a first extruder are coated with a first TPE that due to special chemical and/or physical properties of side chain branches grafted onto the main polymer chain adheres well to the steel, and a second extruder thereafter provides a second TPE that
1. constitutes the basic material of the seal,
2. defines the form of the seal, and
3. by physical blending can adhere well to the first TPE when they are Double-Extruded in the described way.

An example of such a first TPE is Santoprene 8291-85TL that is produced and marketed by Exxon Mobil—a TPE and TPV with a Shore A score of 86. An example of such a second TPE is Santoprene 201-73 that is also produced and marketed by Exxon Mobil—a TPE and TPV with a Shore A score of 78.

The extrusion process may be carried out either A) with a single extrusion die with 2 different resin inlets each connected to one of the 2 extruders, or B) with 2 series-connected extrusion dies each connected to one of the 2 extruders.

The TPEs that can be used for coating the steel wires are much more expensive than the TPEs that can be used as the basic material of the seal. Furthermore, they may have properties such as stiffness that are incompatible with the desired properties of the seal. For example, Santoprene 8291-85TL that can be used as the first TPE is fare more expensive than Santoprene 201-73 which is usable as the basic material. Santoprene 8291-85TL furthermore has a Shore A score of 85, which is higher than desired for a general-purpose rodent proofing seal as well as for a door sweep, while Santoprene 201-73 has a Shore A score of 78, which is ideal for a flexible door seal. Therefore, it would not be an optimal solution to the displacement problem to use the first TPE not only as a coating but also as the basic material of the seal. It is much better to use a Double-Extrusion process where the first extruder provides a first TPE for coating the steel wires and a second cheaper TPE that serves as the basic material of the seal.

The high Shore A score problem can be solved by adding a softening additive such as a plasticizer to the TPE. However, that would not in any way alleviate the high price problem.

The high price problem and the high Shore A score problem can both be alleviated by mixing a too stiff coating with a softer and cheaper compatible polymer e.g. a TPE. Santoprene 8291-85T can for example be mixed with Santoprene 121-50E500 with a Shore A score of 56 or with Santoprene 101-55 with a Shore A score of 59, both of which are TPVs. However, such solutions would still be relatively expensive ones, and mixing with a softer and cheaper TPE would affect the desired adhesion to the steel negatively though the adhesion may be sufficient to solve the displacement problem.

FIG. 1 is a bird's-eye view of a Double-Extrusion production line for producing rodent proofing seals. It shows a wire rack (101)—hidden to the eye—containing 3 rolls of metal wire, a wire positioning member (102) that serves to ensure that the metal wires (103) are properly aligned, a first extrusion die (104) into which the metal wires (103) are fed, and a first extruder (105) with a first extrusion resin that is used for coating the wires with a TPE that has been grafted so it can adhere well to the wires. The wires (103) are coated with the first extrusion resin in the first extrusion die (104). The outlet of the first extruder (105) is by means of a first connecting member (106) connected to the extrusion resin inlet of the first extrusion die (104). The outlet of the first extrusion die (104) is by means of a second connecting member (107) connected to a second extrusion die (108) into which the coated wires (107) are fed. The outlet of a second extruder (109) with a second extrusion resin that is used as the basic material of the seal is by means of a third connecting member (110) connected to the extrusion resin inlet of the second extrusion die (104). In the second extrusion die (108) the coated wires are embedded in the second extrusion resin, and the cross sectional profile of the seal is determined by the shape of the outlet of the die (108). The seal (111) leaves the outlet of the second extrusion die (108) and is cooled in a cooling device (112). Thereafter the cooled seal (113) leaves the cooling device (112) and enters a belt puller (114) that pulls the cooled seal (113) away from the extrusion dies. Finally, the cooled seal (113) leaves the belt puller (114) and is ready for packaging. The cooling device (112) may be any suitable cooling device such as a water bath.

Figure 2:
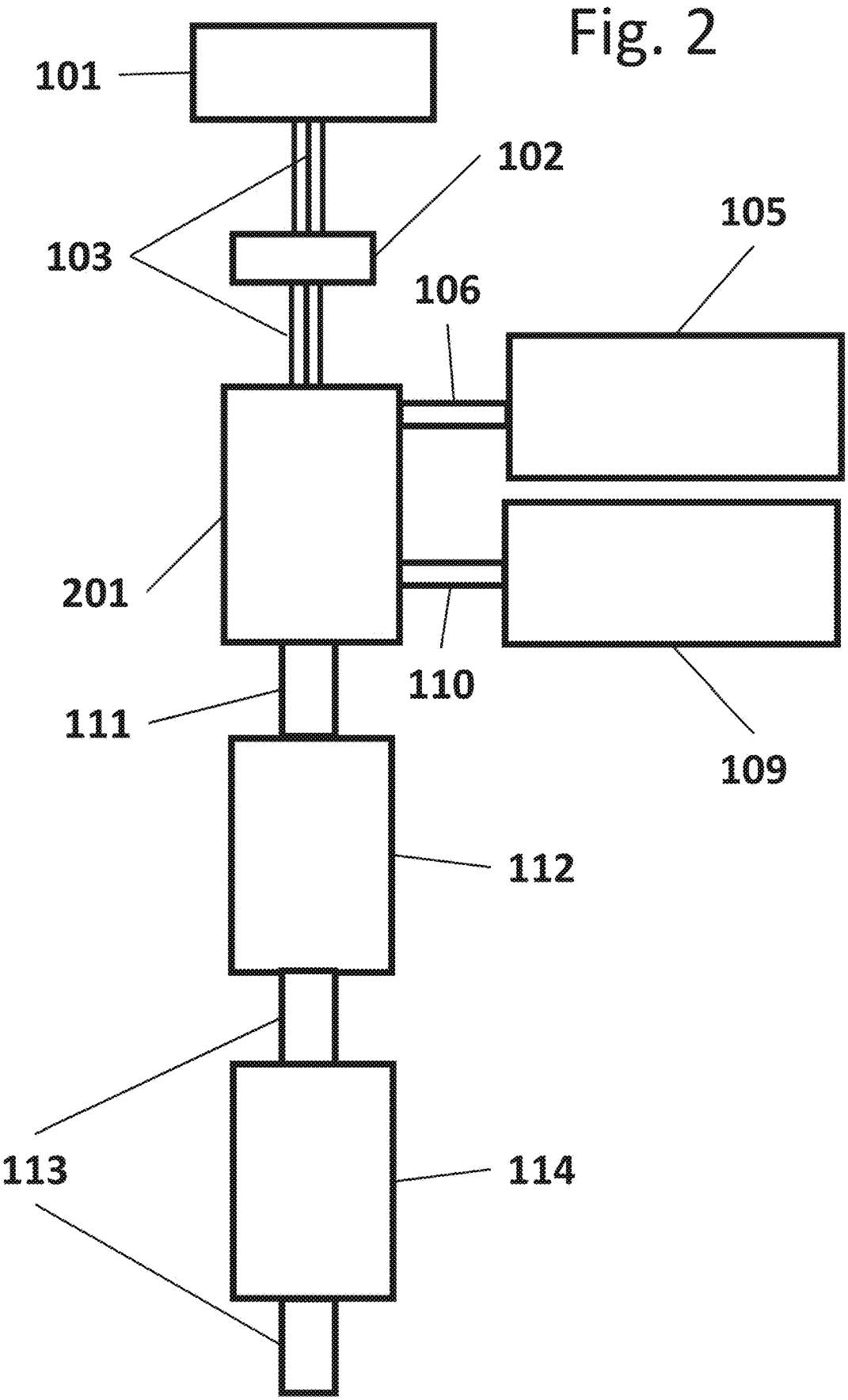
FIG. 2 is a bird's-eye view of a Double-Extrusion production line with a single extrusion die where 3 metal wires are fed into one end of the extrusion die.

In FIG. 1 there are 2 single extrusion dies that are connected in series. However, tt is possible to use a single extrusion die instead of 2 separate dies. That is shown in FIG. 2. It is a bird's-eye view of the Double-Extrusion production line of FIG. 1 where the 2 single extrusion dies (104 and 108) and the connecting member (107) connecting them have been replaced by a single extrusion die (201) with 2 chambers. The wires (103) are coated with the first extrusion resin in the first chamber of the extrusion die. The outlet of the first extruder (105) is by means of the first connecting member (106) connected to the extrusion resin inlet of the first chamber. The outlet of the second extruder (109) with the second extrusion resin that is used as the basic material of the seal is by means of the second connecting member (110) connected to the extrusion resin inlet of the second chamber. In the second chamber the coated wires are embedded in the second extrusion resin. The cross-sectional profile of the seal is determined by the shape of the outlet of the die (201).

Figure 3:
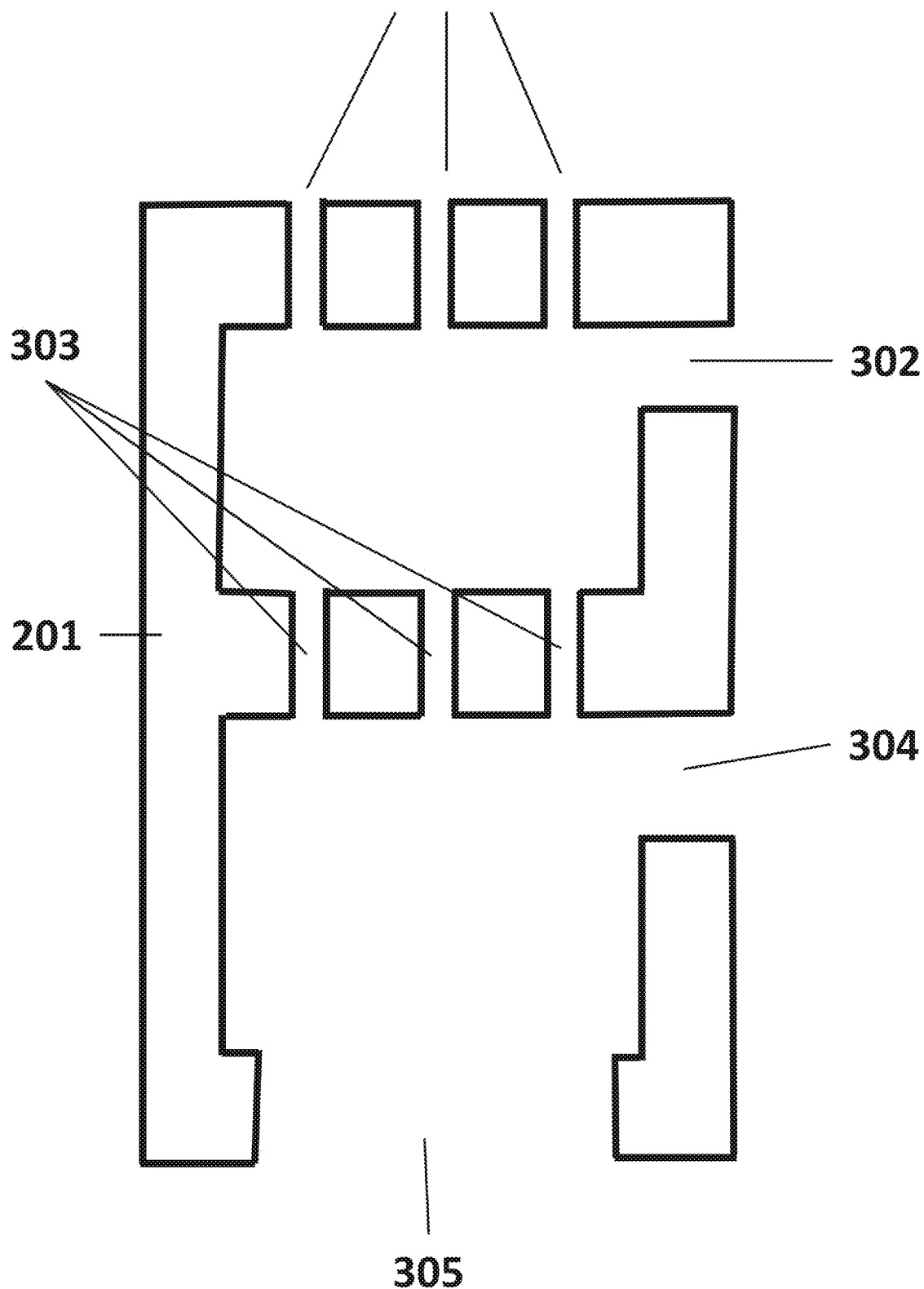
FIG. 3 is a bird's-eye cutaway view of the extrusion die of FIG. 2.

FIG. 3 is a bird's-eye cutaway view of the extrusion die (201) of FIG. 2. The figure shows 3 wire inlets (301) for receiving the metal wires, an resin inlet (302) to the first chamber, 3 combined coated wire outlets of the first chamber and coated wire inlets of the second chamber (303), a resin inlet (304) to the second chamber, and the outlet (305) of the die.

Figure 4:
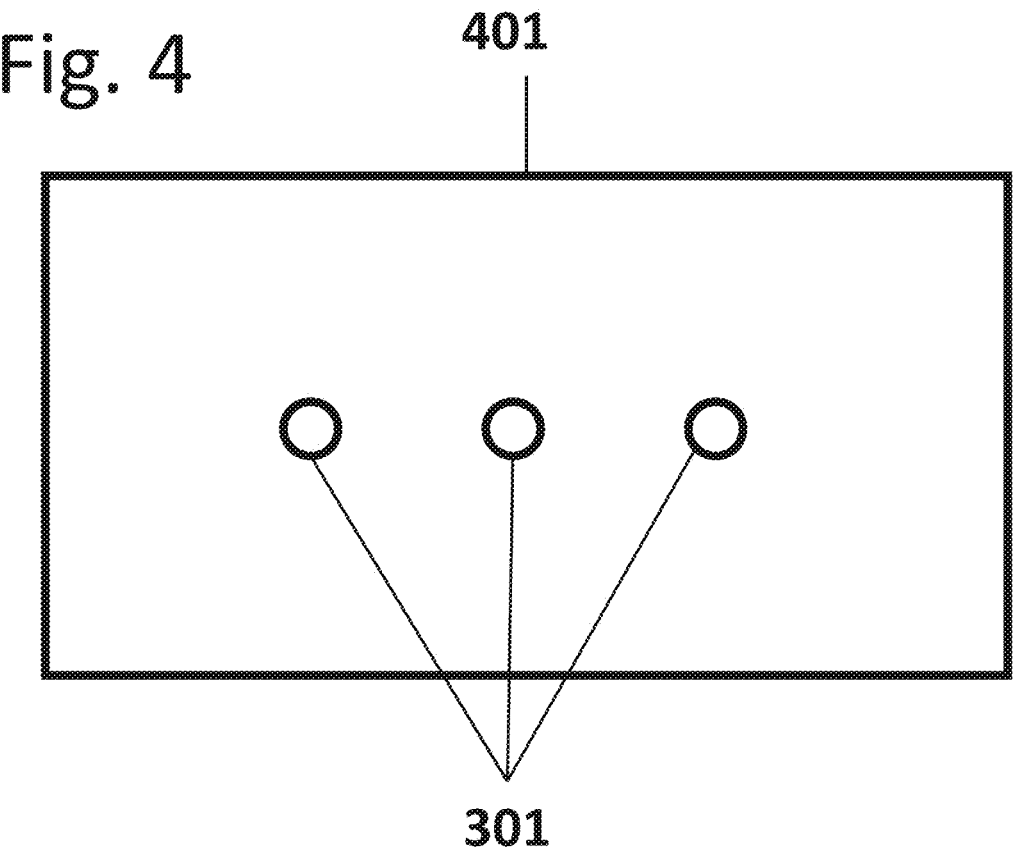
FIG. 4 is the end of the extrusion die of FIG. 2 where 3 metal wires are fed into the die.

FIG. 4 shows the wire inlet end (401) of the extrusion die of FIG. 2 with the 3 wire inlets (301). The diameter of the holes may be around 1 mm such as 0.7 mm, 0.8 mm, 0.9 mm, 1 mm, 1.1 mm. 1.2 mm, 1.3 mm, 1.4 mm, 1.5 mm or 1.6 mm.

Figure 5:
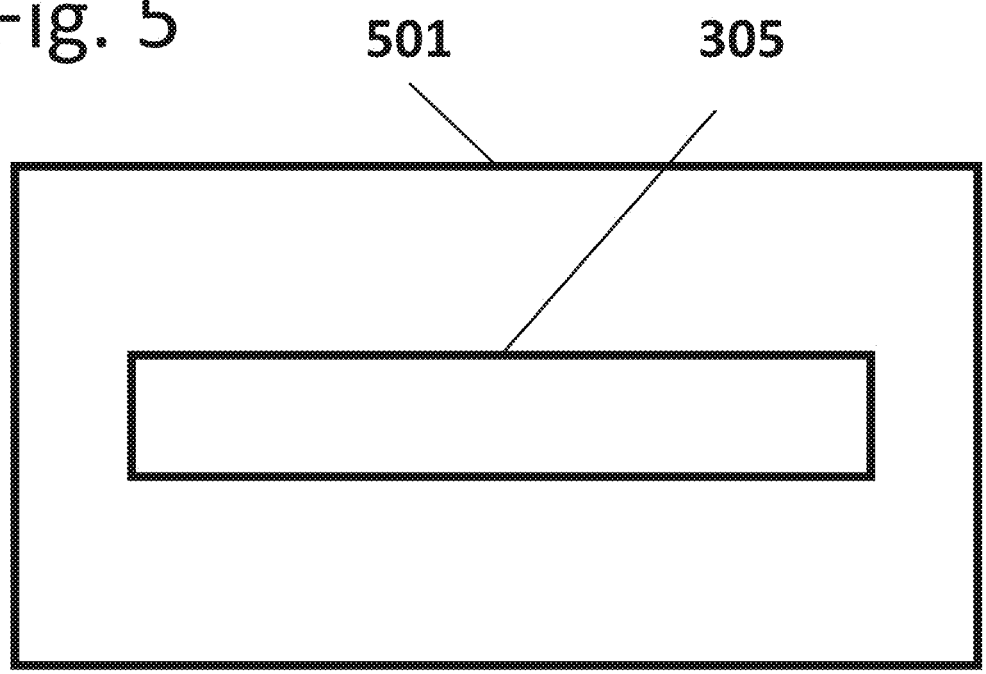
FIG. 5 is the extrusion die of FIG. 2 seen from the outlet end.

FIG. 5 shows the outlet end (501) of the extrusion die of FIG. 2 with the outlet (305).

Figure 6:
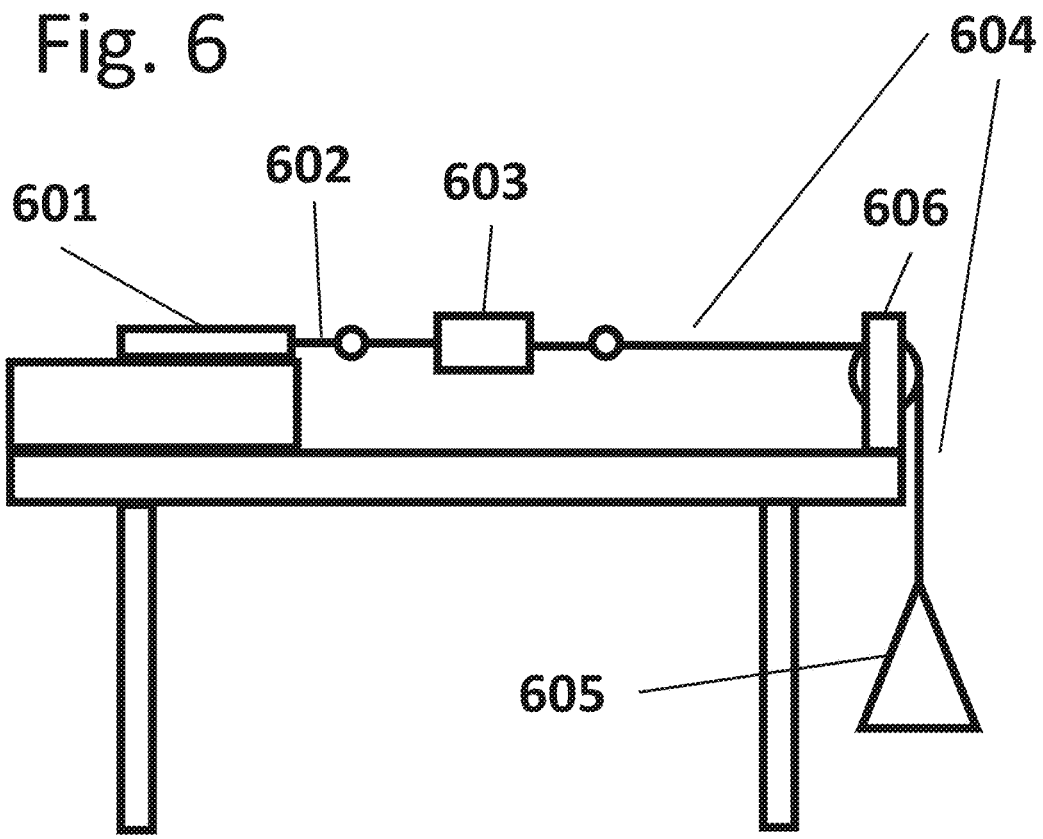
FIG. 6 is a sideview of a test for the measurement of Extraction Resistance.

FIG. 6 is a sideview of a test set-up for the measurement of Extraction Resistance. A piece (601) of rodent proofing seal produced by means of one of the production lines of FIG. 1 and FIG. 2 with an extending metal wire (602) that is connected to a spring weight (603), that in turn by means of a thin and flexible steel wire (604) is connected to a heavy weight (605). The wire (604) runs through a tackle block (606) that is positioned between the spring weight (603) and the heavy weight (605).

Figure 7:
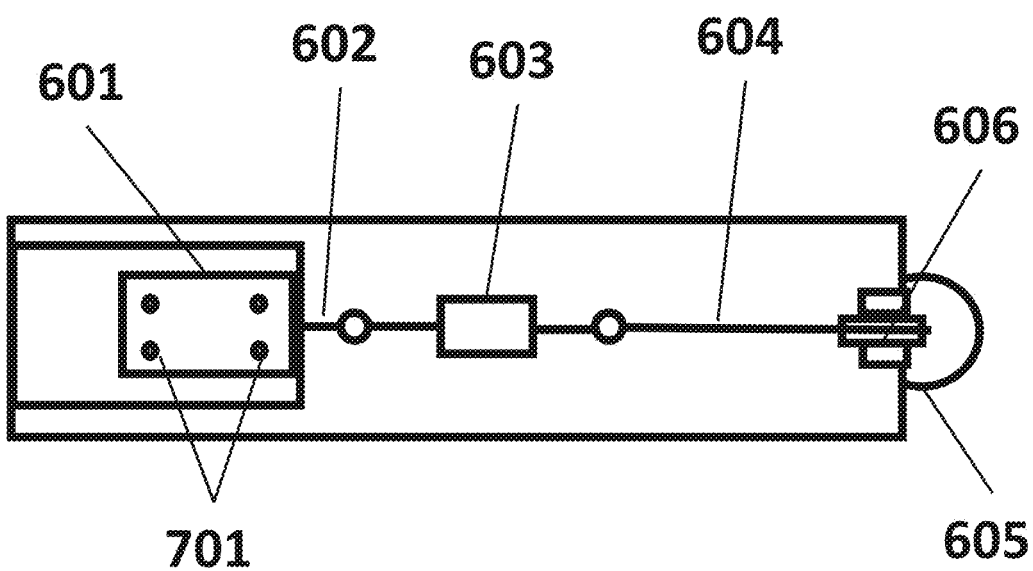
FIG. 7 is a bird's-eye of the test of FIG. 6.

FIG. 7 is a Bird's-eye of the test set-up of FIG. 6. The position of the piece (601) of the seal has been secured by means of 4 broad-headed screws and washers (701). More screws and washers may be used as well as other fasteners. Strips of wood or metal may be used instead of washers—e.g. stiff steel strips placed on each side of the wire and parallel to the longitudinal direction of the wire. Such steel strips may be secured to the base of the test tool by means of suitable fasteners such as screws.

Figure 8:
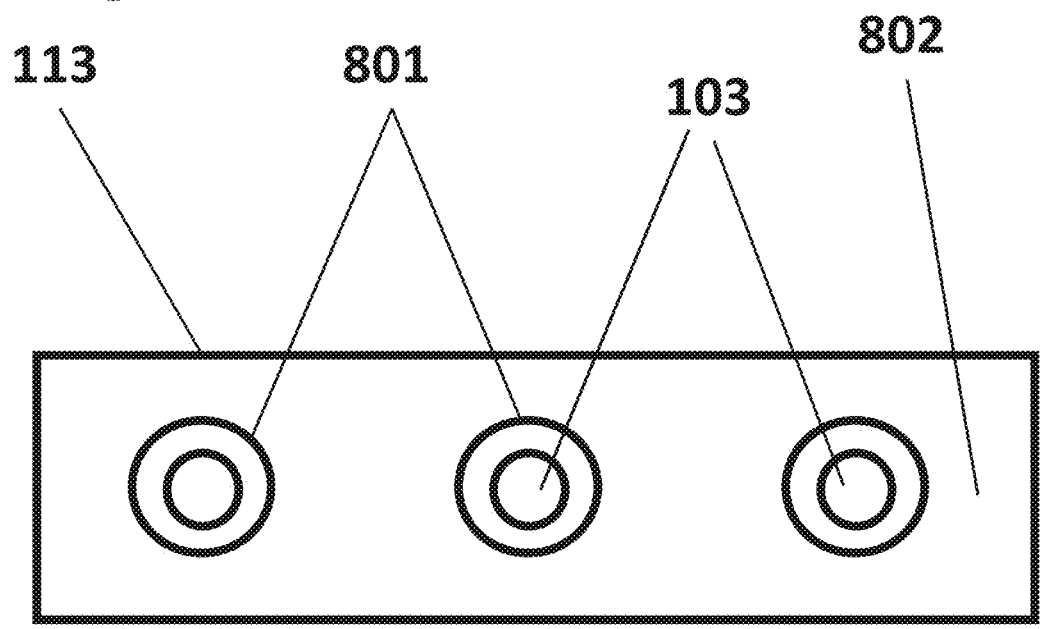
FIG. 8 is a cross sectional view of a rodent proof seal.

FIG. 8 is a cross sectional view of a rodent proofing seal (113) produced by means of one of the production lines of FIG. 1 and FIG. 2. The metal wires (103) are coated with a TPE (801) that has been grafted so it can adhere well to the wires (103). The coated wires (103 and 801) are embedded in a flexible outer body (802), that defines the shape of the seal. Any part of the seal can be used as sealing section. The seal can be mounted by means of broad headed screws and washers placed between 2 of the wires with the washers.

Figure 9:
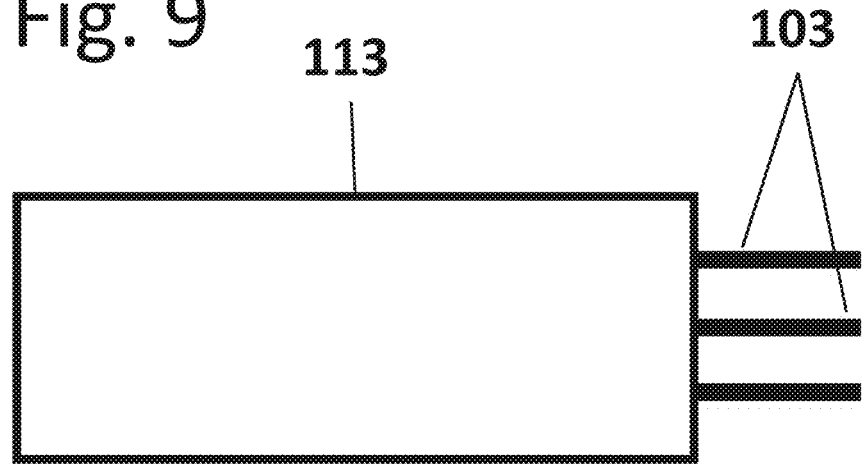
FIG. 9 is the rodent proof barrier of a rodent proof seal partly stripped from the basic material of the seal.

FIG. 9 is a flexible and oblong rodent proofing seal (113) produced by means of one of the production lines of FIG. 1 and FIG. 2 partly stripped from the coating and the flexible outer body (802), so the substantially parallel Separate Metal Wires (103) are exposed.

Figure 10:
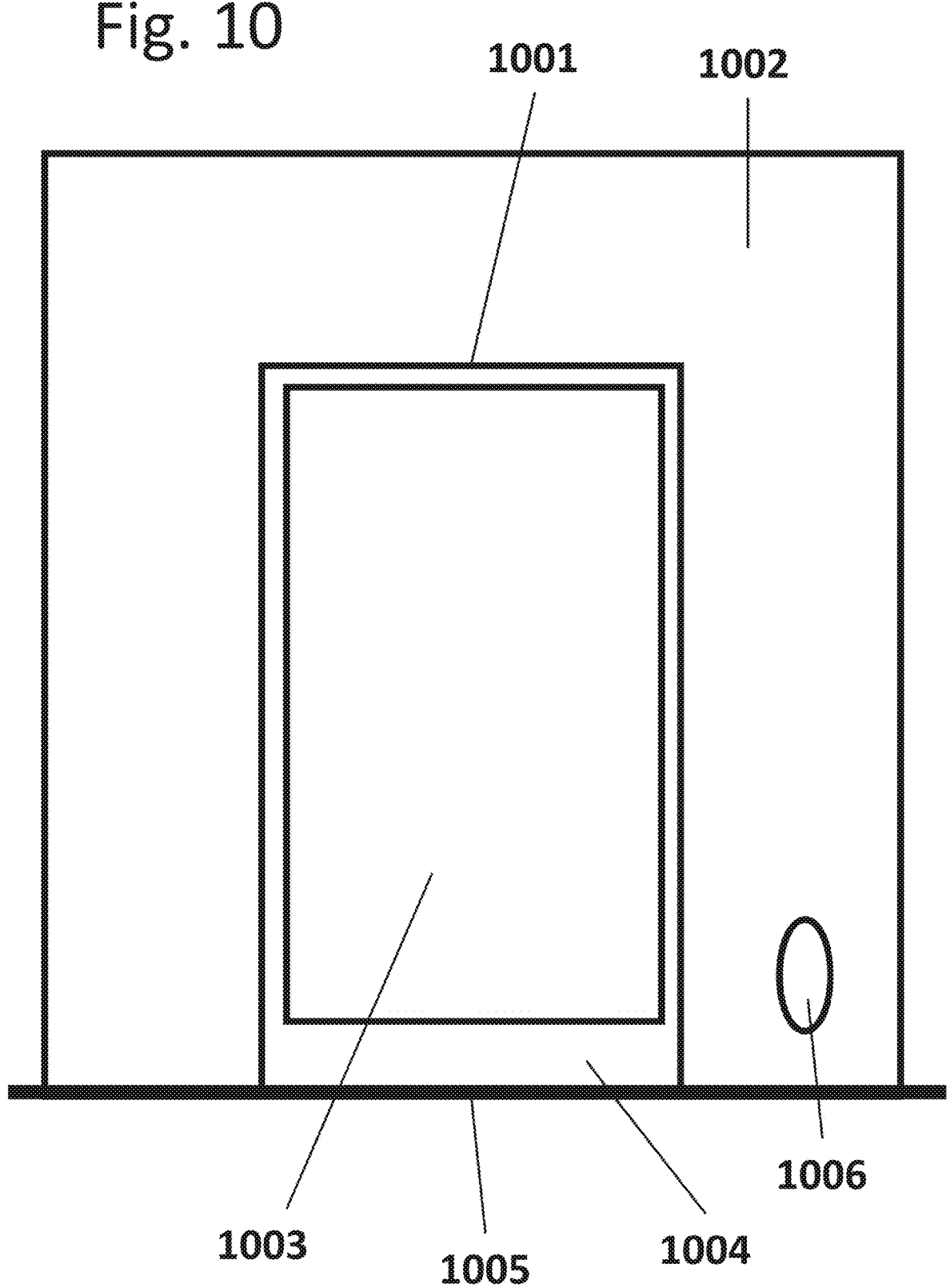
FIG. 10 is an en face view of a hinged swing door in a building.

FIG. 10 is an en face view of a hinged swing door (1001) in a building (1002) with a door blade (1003) and a threshold gap (1004) between the door blade (1003) and the ground (1005). The gap may be rodent proofed by means of a seal according to the invention.

Figure 11:
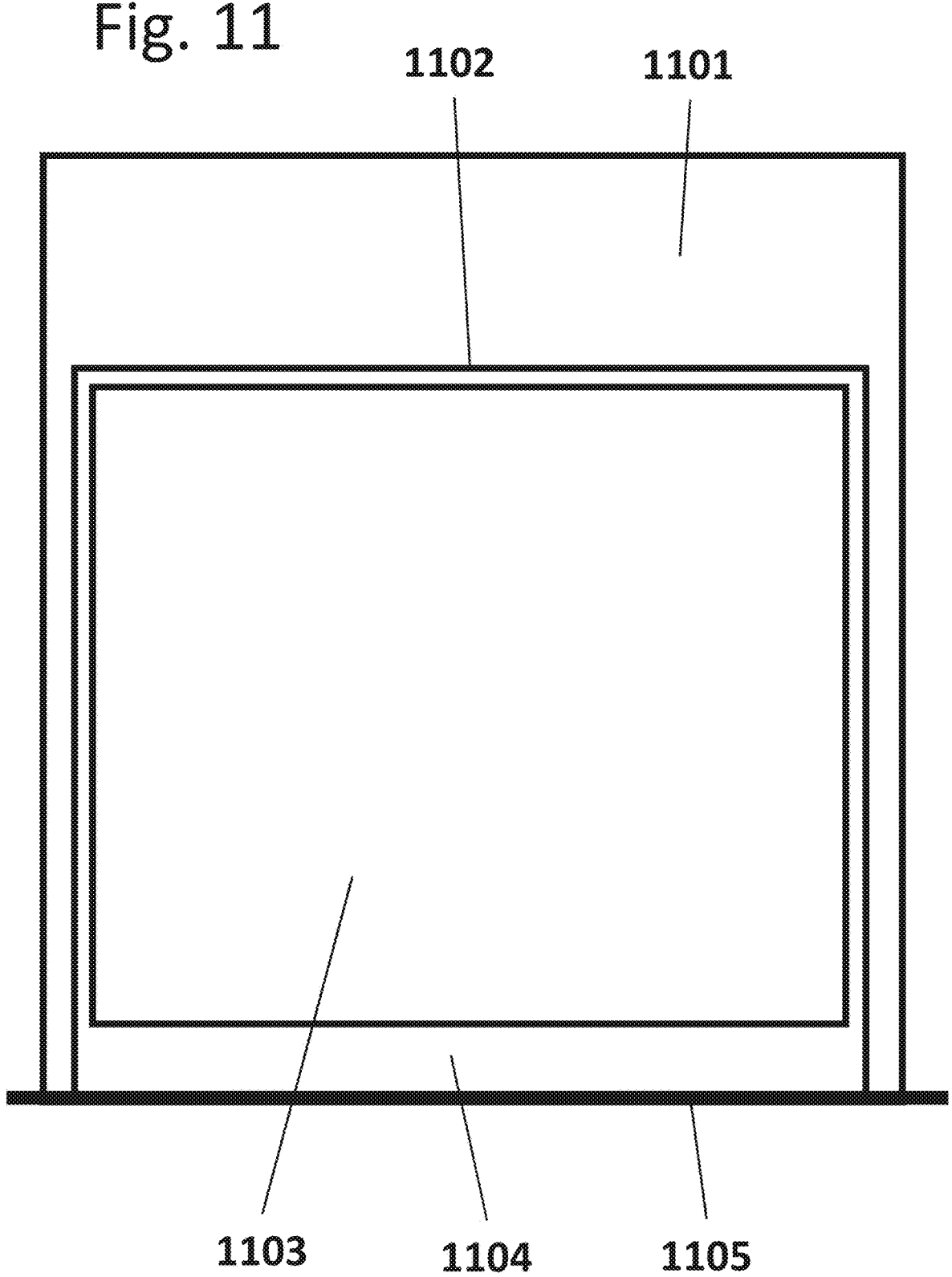
FIG. 11 is an en face view of a garage with a garage door.

FIG. 11 is an en face view of a building in the form of a garage (1101) with a garage door (1102) with a door blade (1103) that opens and closes with up-and-down going movements and a threshold gap (1104) between the door blade (1103) and the ground (1105). The threshold gap may be rodent proofed by means of a seal according to the invention.

Figure 12:
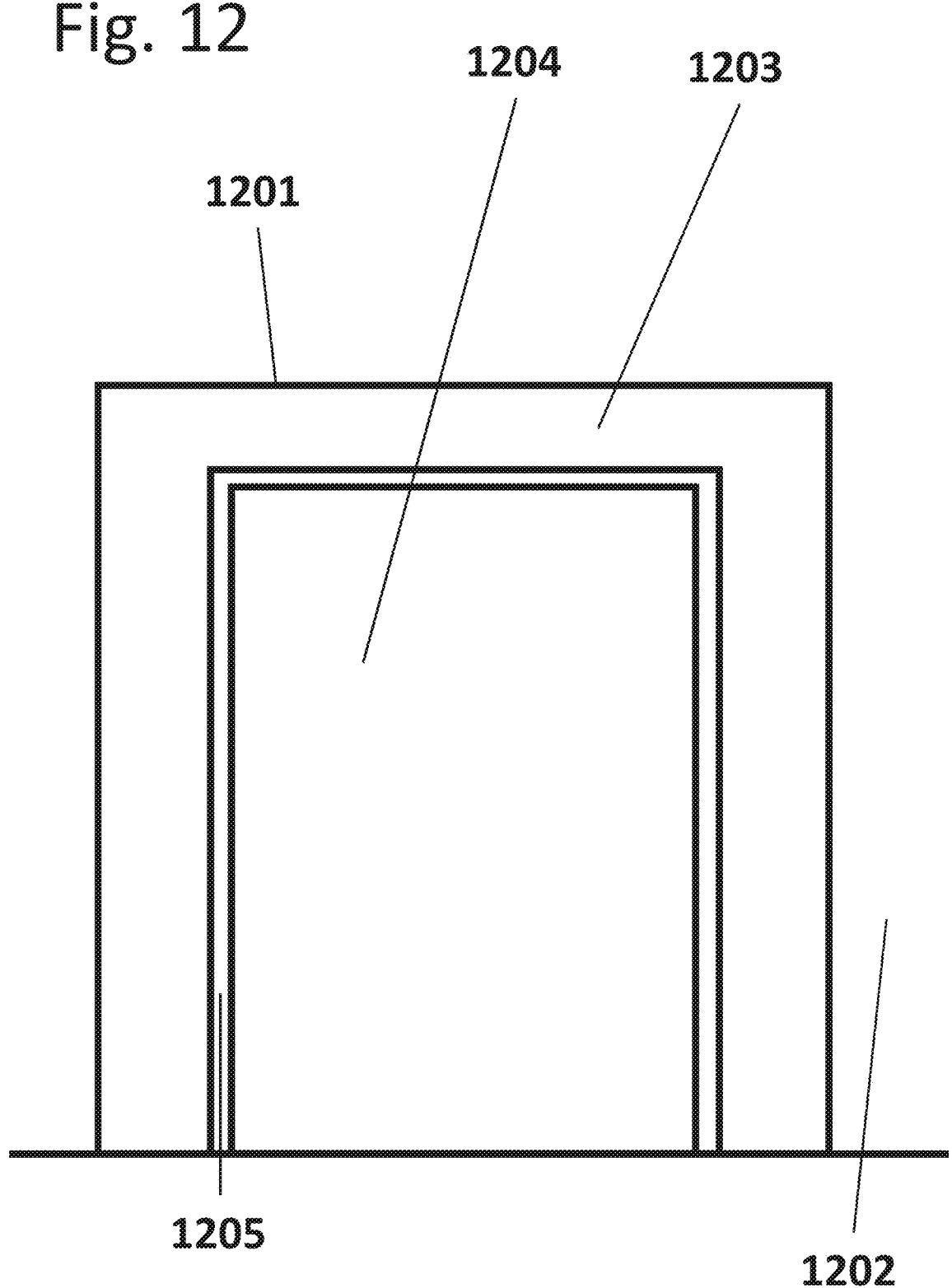
FIG. 12 is a bird's-eye view of a pit dock leveler.

FIG. 12 is a bird's-eye view of a recessed pit dock leveler (1201) in a building (1202) with a dock leveler pit (1203), a dock leveler ramp (1204), and a gap (1205) between the ramp (1204) and the pit (1203). The gap (1205) may be rodent proofed by means of a seal according to the invention.

2. The 1$^{st}$ Aspect—A Rodent Proofing Seal

The first aspect of the invention is an elastic and oblong seal (113) comprising:
 a sealing section (802) comprising:
 1. a flexible outer body (802); and
 2. a rodent resistant barrier embedded in said outer body, said barrier comprising a plurality of Separate Metal Wires (103) arranged at a distance to each other and extending substantially in parallel to a longitudinal direction of the seal (113);
 wherein:
 the flexible outer body (802) comprises at least one Chemically Modified PP; and
 the plurality of Separate Metal Wires (103) comprises at least 3 Separate Metal Wires of solid single stranded metal.

The seal may be a combined door sweep and general-purpose seal used for rodent proofing at least one kind of gaps selected from the group consisting of: A) gaps between a movable building parts and adjacent surfaces e.g. threshold gaps of garage doors (1104), B) gaps between stationary building parts and adjacent surfaces. C) gaps between door blades and adjacent surfaces (1004, 1104), D) threshold gaps of hinged swing doors (1004), E) gaps between ramps of recessed pit dock levelers and adjacent surfaces (1205), and F) stationary gaps in buildings (1006).

The at least 1 Chemically Modified PP may be a modified PP selected from the group consisting of: a MAPP, a PP grafted with methacrylic acid, a PP grafted with glycidyl methacrylate, a PP grafted with vinyl trimethoxysilane, and a PP grafted with methacryl trimethoxysilane.

The at least 1 Chemically Modified PP may be a MAPP.

The flexible outer body (802) may comprise a TPE in the form of a TPV with particles of cured rubber and a matrix comprising at least 1 Chemically Modified PP e.g. a MAPP.

The flexible outer body (802) may have a Shore A hardness score of at least 60 and at most 90 such as at least 65 and at most 85.

The flexible outer body (802) may be made of Santoprene™ 8291-TL85.

The seal (113) may be a blade seal.

The at least 3 Separate Metal Wires (103) may have a diameter of at least 0.5 mm.

The at least 3 Separate Metal Wires (103) may be Straight Metal Wires.

The at least 3 Separate Metal Wires (103) may be made of steel.

The Extraction Resistance of at least one of the at least 3 Separate Metal Wires (103) may be at least 197 Newton.

An Extraction Resistance test and a wire displacement test have been run on a seal with the above-described features. The seal had a cross-sectional profile in the form of a 3 mm thick and 60 mm wide rectangle. The flexible outer body of the seal was made of a TPE in the form of a TPV with a PP matrix comprising MAPP. The Shore A hardness score of the flexible outer body was 86. A rodent proofing barrier consisting of 10 solid single stranded steel wires with a diameter of 1 mm was embedded in the basic material. The wires were parallel to each other and to the longitudinal direction of the seal. All the wires were Separate Metal Wires and Straight Metal Wires. The distance between neighboring steel wires was 5 mm. The cross-sectional distance from the 2 outermost wires to the adjacent edges was 3 mm. The cross-sectional distance from the wires to the 2 flat surfaces was 1 mm on each side of the wires. The wires were not coated in any way, so they were embedded directly in the basic material.

The Extraction Resistance test was:

A wire embedded in a 14 cm long test sample of the seal was subjected to an extraction force of 197 Newton. After 60 seconds the position of the tested wire was unchanged.

The wire displacement test was:

A 60 cm long test sample of the seal was by means of broad-headed 5 mm thick screws and washers mounted on the bottom of the 60 cm broad door blade of a hinged swing door. The threshold gap of the door was 25 mm high. The seal covered the entire threshold gap and was thus in contact with the ground. A 10 mm high, 30 mm broad and 280 mm long obstacle in the form of a flat bar of steel was placed in front of the door blade and substantially parallel to the door blade. The flat bar was fixated to the ground by means of 3 panhead screws. The screw heads extended 3 mm above the steel bar. The door was opened and closed at the speed of around 2 seconds per opening and closing. After 1,500 openings and closings all the wires remained in their original positions.

The conclusion is that the adhesion of the flexible outer body to the steel was sufficiently strong.

Similar Extraction Resistance and wire displacement tests have been run on a similar seal where 80% of the flexible outer body of the seal was a TPE in the form of a TPV with a PP matrix comprising MAPP and a Shore A hardness of 86. The remaining 20% was another TPE in the form of a TPV. The PP matrix of this second TPV did not contain any Chemically Modified PP. The hardness of the second TPV was 56. The hardness of the flexible outer body was 80 on the Shore A scale.

The Extraction Resistance test was:

A wire embedded in a 14 cm long test sample of the seal was subjected to an extraction force of 197 Newton. After 60 seconds the position of the tested wire was unchanged.

In the displacement test all the wires remained in their original positions after 1,500 openings and closings.

The conclusion is that the adhesion of the flexible outer body to the steel was sufficiently strong.

Similar Extraction Resistance and wire displacement tests have been run on 2 similar seals where the flexible outer body also was a TPE in the form of a TPV but none of the 2 seals' flexible outer bodies comprised any Chemically Modified PP. The flexible outer body of one of the 2 seals had a Shore A hardness of 78, and the flexible outer body of the other one a Shore A hardness of 59.

The Extraction Resistance tests were:

A wire embedded in a 14 cm long test sample of the seal with the Shore A hardness of 78 was subjected to an extraction force of 49 Newton. The wire was completely extracted in 38 seconds.

A wire embedded in a 14 cm long test sample of the seal with the Shore A hardness of 59 was subjected to an extraction force of 49 Newton. After 60 seconds the wire had not been completely extracted.

A wire embedded in a 14 cm long test sample of the seal with the Shore A hardness of 59 was subjected to an extraction force of 98 Newton. The wire was completely extracted in 44 seconds.

In the displacement test of the seal with the Shore A hardness of 78 all the wires remained in their original positions after 100 openings and closings. After 200 openings and closings 2 of the wires were forced several mm out of the left end of the seal.

In the displacement test of the seal with the Shore A hardness of 59 all the wires remained in their original positions after 300 openings and closings. After 400 openings and closings 1 of the wires were forced several mm out of the left end of the seal.

The conclusion is A) that the adhesion of the outer bodies of the 2 seals was insufficient, B) that sufficient adhesion will require an Extraction Resistance well above 98 Newton, and C) that an increase of Extraction Resistance around 49 will substantially improve the performance in the displacement test.

Based on all the above tests it seems reasonable to conclude that satisfactory adhesion between the flexible outer body and the metal wires will be achieved when the Extraction Resistance is 197 Newton or more.

In an implementation form of the invention only a part of the TPE of the flexible outer body comprises Chemically Modified PP e.g. MAPP. That part may volume-wise constitute less than 40% of the flexible outer body. Said less than 40% may serve as a coating on at least 2 of the at least 3 Separate Metal Wires, so it substantially encompasses the at least 2 metal wires.

3. The $2^{nd}$ Aspect—A Production Method

The $2^{nd}$ aspect of the invention is a method of producing in a single combined Co-Extrusion and Double-Extrusion process a seal (113) of any of the implementation forms of the first aspect of the invention, wherein the plurality of substantially parallel metal wires (103) are Separate Metal Wires as well as Straight Metal Wires comprising the steps of:

feeding the plurality of metal wires (103) into an extrusion die (104, 201);

by means of a first extruder (105) coating the plurality of substantially parallel metal wires (103) with a first TPE (801) comprising at least 1 Chemically Modified PP; and by means of a second extruder (109) embedding the coated plurality of substantially parallel metal wires (103 and 801) in a second TPE (802).

The second TPE (802) will by means of physical blending adhere well to the first TPE (801) when the 2 TPEs are Double-Extruded in the described way.

As shown in FIGS. 1, 2, and 3 the 2 extruders may be connected to a single die (201) or to 2 or more dies connected in series (104, 108).

The crosshead extrusion process that is widely used for coating electrical wires with insulation may be used when coating the metal wires.

The at least 1 Chemically Modified PP may be a modified PP selected from the group consisting of: a MAPP, a PP grafted with methacrylic acid, a PP grafted with glycidyl methacrylate, a PP grafted with vinyl trimethoxysilane, and a PP grafted with methacryl trimethoxysilane.

The at least 1 Chemically Modified PP may be a MAPP.

The at least 1 Chemically Modified PP may be Santoprene™ 8291-85TL.

The second TPE may be a TPE in the form of a TPV not comprising any Chemically Modified PP.

The second TPE may be Santoprene™ 201-73.

The coating on the plurality of substantially parallel metal wires (103) may be at least 0.05 mm thick.

4. The $3^{rd}$ Aspect—A Rodent Proofing Seal

The third aspect of the invention is a seal (113) of the first aspect of the invention produced by means of any of the implementation forms of the method of the $2^{nd}$ aspect.

The invention claimed is:

1. An elastic and oblong seal comprising:
   a sealing section comprising:
   a flexible outer body; and
   a rodent resistant barrier embedded in said outer body, said barrier comprising a plurality of separate metal wires arranged at a distance to each other and extending substantially in parallel to a longitudinal direction of the seal;
   wherein:
   the flexible outer body comprises a thermoplastic elastomer (TPE) that constitutes the basic material of the seal and defines a form of the seal; and
   the plurality of separate metal wires comprises at least three separate metal wires each of solid single stranded metal,
   wherein at least two of the at least three separate metal wires of solid single stranded metal are encompassed by a different thermoplastic elastomer (different TPE) comprising at least one chemically modified polypropylene (PP), selected from the group consisting of: a polypropylene (PP) grafted with carboxylic acid, a polypropylene (PP) grafted with anhydride groups, a polypropylene (PP) grafted with epoxides, a polypropylene (PP) grafted with silanes, a maleic anhydride grafted polypropylene (MAPP), a polypropylene (PP) grafted with methacrylic acid, a polypropylene (PP) grafted with glycidyl methacrylate, a polypropylene (PP) grafted with vinyl trimethoxysilane, and a polypropylene (PP) grafted with methacryl trimethoxysilane.

2. The seal according to claim 1, wherein the seal is configured for rodent proofing buildings.

3. The seal according to claim 1, wherein the at least one chemically modified polypropylene (PP) is a modified polypropylene (PP) selected from the group consisting of: the maleic anhydride grafted polypropylene (MAPP), the polypropylene (PP) grafted with methacrylic acid, the polypropylene (PP) grafted with glycidyl methacrylate, the polypropylene (PP) grafted with vinyl trimethoxysilane, and the polypropylene (PP) grafted with methacryl trimethoxysilane.

4. The seal according to claim 1, wherein the at least one chemically modified polypropylene (PP) is the maleic anhydride grafted polypropylene (MAPP).

5. The seal according to claim 1, wherein the at least one chemically modified polypropylene (PP) occurs in a polypropylene (PP) matrix of a thermoplastic vulcanizate with particles of cured rubber encapsulated in a matrix of polypropylene (TPV).

6. The seal according to claim 1, wherein a thickness of the different thermoplastic elastomer (TPE) comprising at least one chemically modified polypropylene (PP) and substantially encompassing the at least two separate metal wires is at least 0.05 mm.

7. The seal according to claim 1, wherein the at least two separate metal wires are straight metal wires.

8. The seal according to claim 1, wherein the at least two separate metal wires are steel wires.

9. The seal according to claim 1, wherein at least one of the at least two separate metal wires has an extraction resistance of at least 197 newton.

10. A method of producing in a single co-extrusion process a seal according to claim 1, wherein the plurality of substantially parallel metal wires are separate metal wires as well as straight metal wires, said method comprising the steps of:
feeding the plurality of substantially parallel metal wires into an extrusion die;
further comprising further double extrusion steps:
by means of a first extruder coating the at least two separate metal wires with the different thermoplastic elastomer (TPE) comprising the at least one chemically modified polypropylene (PP) selected from the group consisting of: the polypropylene (PP) grafted with carboxylic acid, the polypropylene (PP) grafted with anhydride groups, the polypropylene (PP) grafted with epoxides, the polypropylene (PP) grafted with silanes, the maleic anhydride grafted polypropylene (MAPP), the polypropylene (PP) grafted with methacrylic acid, the polypropylene (PP) grafted with glycidyl methacrylate, the polypropylene (PP) grafted with vinyl trimethoxysilane, and the polypropylene (PP) grafted with methacryl trimethoxysilane; and by means of a second extruder embedding the coated metal wires in the second thermoplastic elastomer (TPE).

11. The method according to claim 10, wherein the at least two separate metal wires are coated with at least 0.05 mm of the different thermoplastic elastomer (TPE) comprising the at least one chemically modified polypropylene (PP).

12. The method according to claim 10, wherein the thermoplastic elastomer (TPE) is a thermoplastic elastomer (TPE) in a form of a thermoplastic vulcanizate with particles of cured rubber encapsulated in a matrix of polypropylene (TPV) that does not comprise any chemically modified polypropylene (PP).

13. The method according to claim 10, wherein: the thermoplastic elastomer (TPE) is the maleic anhydride grafted polypropylene (MAPP); and the maleic anhydride grafted polypropylene (MAPP) occurs in a polypropylene (PP) matrix of a thermoplastic vulcanizate with particles of cured rubber encapsulated in a matrix of polypropylene (TPV).

14. The seal according to claim 1, wherein:
the at least two of the at least three separate metal wires are only coated with the at least one chemically modified PP, and
the TPE that constitutes the basic material of the seal and defines the form of the seal is made of a different TPE from the different TPE coated on the at least two of the at least three separate metal wires.

* * * * *